United States Patent [19]

Ohori et al.

[11] 4,240,671
[45] Dec. 23, 1980

[54] BRAKING HYDRAULIC PRESSURE CONTROL UNIT FOR MOTOR VEHICLE

[75] Inventors: Harumi Ohori; Masayoshi Katagiri; Tomoyuki Nogami, all of Toyota, Japan

[73] Assignee: Toyota Jidosha Kogyo Kabushiki Kaisha, Toyota, Japan

[21] Appl. No.: 13,449

[22] Filed: Feb. 21, 1979

[30] Foreign Application Priority Data

Jun. 22, 1978 [JP] Japan .............................. 53-85994[U]

[51] Int. Cl.³ .............................................. B60T 8/14
[52] U.S. Cl. .................................... 303/6 C; 188/349; 303/24 A; 303/24 C; 303/24 F
[58] Field of Search ........................ 303/24, 6 C, 87; 188/349, 195

[56] References Cited

U.S. PATENT DOCUMENTS

| 3,944,292 | 3/1976 | Doi et al. ............................ 303/24 C |
| 4,072,363 | 2/1978 | Tomoyuki ........................... 303/24 C |
| 4,161,339 | 7/1979 | Kawaguchi et al. .......... 303/24 C X |

FOREIGN PATENT DOCUMENTS 1061352  3/1967  United Kingdom.
1211201  11/1970  United Kingdom.

*Primary Examiner*—Douglas C. Butler
*Attorney, Agent, or Firm*—Cushman, Darby & Cushman

[57] ABSTRACT

A braking hydraulic pressure control unit for a motor vehicle including a differential-acting piston having a plurality of pressure bearing portions facing an inlet compartment and an outlet compartment communicating with a master cylinder and rear wheel cylinders, respectively, of a vehicle braking system. The differential-acting piston is formed with shoe clearance compensating piston segments operative to reduce an inflow of a braking fluid into a spherical valve chamber at initial stages of brake application whereby unfavorable influences which would otherwise be exerted by the size of shoe clearances on a spherical valve at initial stages of brake application can be prevented.

4 Claims, 3 Drawing Figures

BRAKING HYDRAULIC PRESSURE CONTROL UNIT FOR MOTOR VEHICLE

BACKGROUND OF THE INVENTION (1) Field of the Invention

This invention relates to braking hydraulic pressure control units for motor vehicles, and more particularly to improvements in or relating to a braking hydraulic pressure control unit of the deceleration sensing type mounted in a hydraulic pressure circuit connecting a master cylinder to rear wheel cylinders and responsive to the degree of deceleration of the vehicle for controlling a braking hydraulic pressure introduced into the rear wheel cylinders when the brake is applied.

(2) Description of the Prior Art

It is theoretically known that in order to evenly decelerate front wheels and rear wheels of a motor vehicle to stably control brake application when the brake is applied, it is necessary to control a braking hydraulic pressure in such a manner that an increase in the braking hydraulic pressure supplied from a master cylinder to rear wheel cylinders of a vehicle braking system is gradually reduced in comparison with a rise in the braking hydraulic pressure supplied to front wheel cylinders. As one type of braking device which enables the aforesaid control to be effected, a braking system is widely known which includes a braking hydraulic pressure control valve of the deceleration sensing type mounted in a circuit connecting the master cylinder to the rear wheel cylinders. The braking hydraulic pressure control valve of the type described which is widely used nowadays has a spherical valve floatingly contained in a valve chamber communicating with the master cylinder and the rear wheel cylinders, and a differential-acting piston which bears the hydraulic pressure on its master cylinder side and the hydraulic pressure on its rear wheel cylinder side. This valve is characterized in that when the deceleration of a motor vehicle reaches a predetermined level at the time of brake application, the spherical valve is moved by inertia in a vehicle traveling direction to close a spherical valve port to thereby interrupt communication between the master cylinder and the rear wheel cylinders and thereafter to raise the pressure of the braking fluid on the rear wheel cylinder side, which is thus separated from the braking fluid on the master cylinder side, at a predetermined reduced rate by the action of the hydraulic pressure on the master cylinder side through the agency of the differential-acting piston. Thus, until the spherical valve port is closed the pressure of the braking fluid in the rear wheel cylinders raises at the same rate as the pressure of the braking fluid in front wheel cylinders which are in communication with the master cylinder, and after the spherical valve port is closed the pressure of the braking fluid in the rear wheel cylinders rises at a lower rate than the pressure of the braking fluid in the front wheel cylinders. By this arrangement, the distribution of a braking force between the front wheels and the rear wheels of the vehicle can be expressed by a line which is bent at a dividing point corresponding to the point in time of the closure of the spherical valve port, and approximated to a theoretically ideal braking force distribution.

The hydraulic pressure at this dividing point varies depending on the size of shoe clearances of rear brakes. Generally, the dividing point tends to become low when the shoe clearances increase in size and to become high when they decrease in size. This phenomenon is caused by the fact that a dynamic pressure produced by the flow of the braking fluid is applied to the spherical valve.

SUMMARY OF THE INVENTION

This invention has as its object the provision of a braking hydraulic pressure control unit for a motor vehicle in which means is provided for minimizing the flow rate of braking fluid flowing through a spherical valve section at initial stages of brake application so as to particularly compensate for changes in the size of shoe clearances.

The characterizing feature of the invention is that the braking hydraulic pressure control unit comprises a differential-acting piston formed with compensating piston segments for reducing an inflow of a braking fluid into a valve chamber at initial stages of brake application. As compared with a braking hydraulic pressure control valve of the prior art, the braking hydraulic pressure control unit provided with this feature is not very complex in construction and occupies substantially the same space. By virtue of this feature, the braking hydraulic pressure control unit is capable of avoiding unfavorable influences which would otherwise be exerted by the size of shoe clearances on a spherical valve at initial stages of brake application, and has particular utility when the brake is applied suddenly.

Since the movement of the spherical valve is stabilized, it is possible to reduce the distance the spherical valve rollingly moves, thereby further stabilizing the movement of the spherical valve.

DESCRIPTION OF PREFERRED EMBODIMENTS

Figure 1:
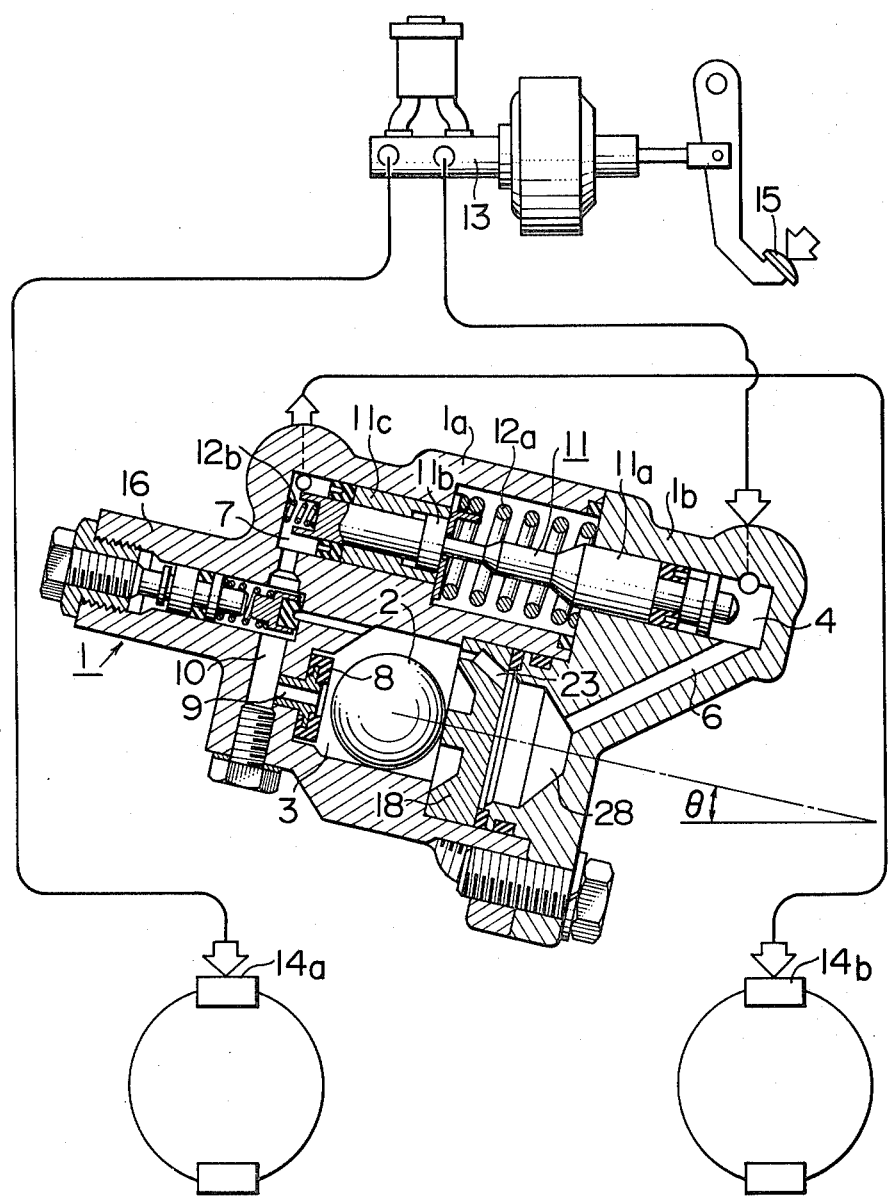
FIG. 1 is a sectional view of the braking hydraulic pressure control unit comprising a preferred embodiment of the invention, showing the essential portions of the unit.

The invention will now be described by referring to the embodiments shown in the accompanying drawings. In FIG. 1 which shows a braking hydraulic pressure circuit, a valve housing 1 includes a valve body 1a and an end cover 1b connected unitarily to the valve body 1a. The valve housing 1 is formed in an inner lower portion thereof with a valve chamber 3 which communicates through a throttle passage 23 in a partition plate 18, an open space 28 and a passage 6 with an inlet compartment 4 in communication with a master cylinder 13 and through a valve port 9 having a valve seat 8 attached to its edge, and a passage 10 with an outlet compartment 7 in communication with rear wheel cylinders 14b. A differential-acting piston 11 is contained in an inner upper portion of the valve housing 1 and comprises a main piston segment 11a having an end surface facing the inlet compartment 4 and bearing the hydraulic pressure in the master cylinder 13, and first and second piston segments 11b and 11c bearing the hydraulic pressure in the rear wheel cylinders 14b at an end surface of the piston 11 facing the outlet compartment 7. The differential-acting piston 11 is urged to move by the biasing forces of springs 12a and 12b. In the figure, 14a designates front wheel cylinders, 15 a brake pedal, and 16 a bypass valve portion. The front wheel cylinders 14a directly communicate with the master cylinder 13.

The piston segments 11a, 11b and 11c which function as a differential-acting piston also have the function of compensating for the size of shoe clearances. This function will be described in detail. In a control valve unit using a differential-acting valve of the prior art, the flow rate of a braking fluid and the flow velocity thereof through the valve chamber 3 vary depending on the size of shoe clearances of a brake system at initial stages of brake application. Thus changes are caused to occur in the dynamic pressure applied to the spherical valve 2 by the flow of the braking fluid. This phenomenon is particularly marked when the brake is applied abruptly, resulting in premature closing of the port 9 by the spherical valve 2. In extreme cases, the valve port 9 may be closed by the spherical valve 2 before the pressure of the braking fluid in the rear wheel cylinders appreciably rises, thereby hampering the application of the brake in a proper manner. The differential-acting piston 11 according to the invention is capable of reducing shoe clearances substantially to zero.

Figure 2:
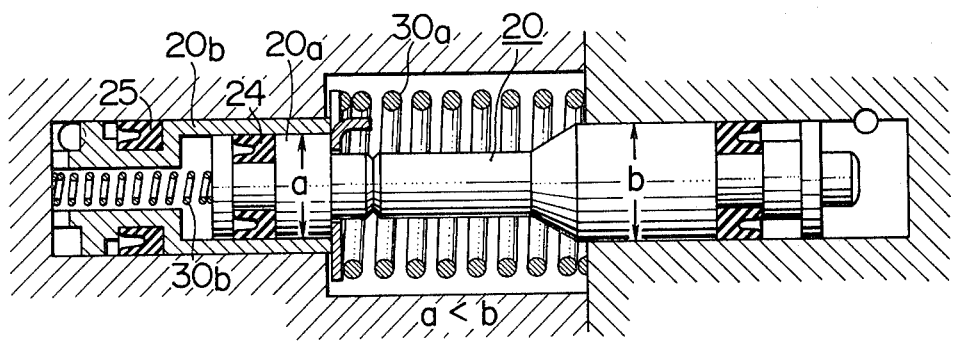
FIGS. 2 and 3 are sectional views showing modifications of the differential-acting piston of the unit.

The differential-acting piston 11 shown in FIG. 1 is of a construction such that the quantity of fluid is controlled to reduce shoe clearances. Likewise, a differential-acting piston shown in FIG. 2 is also of a construction such that the quantity of fluid is controlled. However, a differential-acting piston shown in FIG. 3 is designed to control hydraulic pressure to accomplish the same object.

More specifically, in the differential-acting piston 11 shown in FIG. 1, the main piston segment 11a and the first piston segment 11b are pressed by the hydraulic pressure in the master cylinder 13, so that the piston 11 moves leftwardly in FIG. 1, because the main piston segment 11a has a greater diameter than the first piston segment 11b. At the same time, the hydraulic pressure in the master cylinder 13 is transmitted to the outlet compartment 7 through the valve chamber 3. When this is the case, a reduction in the volume of the outlet compartment 7 caused by the leftward movement of the first piston segment 11b in FIG. 1 is substantially tantamount to an elimination of shoe clearances. Thus a change in the quantity of the braking fluid flowing through the valve chamber 3 which would be caused by the size of shoe clearances can be neglected to all intents and purposes, with the result that the spherical valve 2 can be actuated suitably. When the hydraulic pressure in the outlet chamber 7 exceeds a predetermined level, the second piston segment 11c moves rightwardly in FIG. 1 against the biasing force of spring 12a.

The differential-acting piston 20 shown in FIG. 2 operates in the same manner as the corresponding element in FIG. 1. Although the first piston segment 20a and the second piston segment 20b are distinct from each other in shape, this difference in shape derives from the manner in which seal members 24 and 25 are used.

Figure 3:
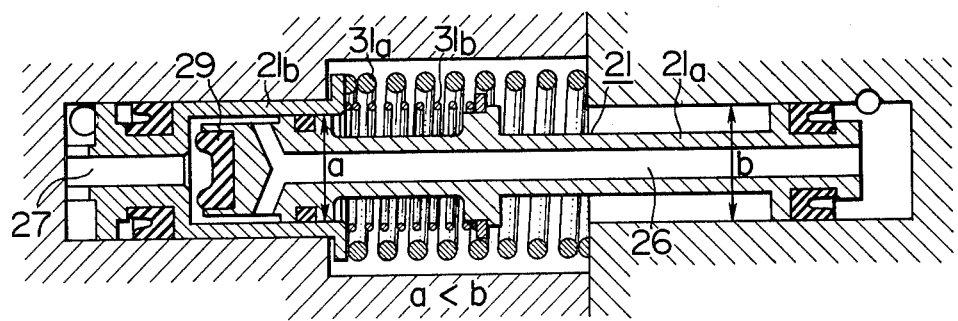

The differential-acting piston 21 of FIG. 3 has an inlet compartment side piston segment 21a and an outlet compartment side piston segment 21b which have hollow portions 26 and 27 respectively. At initial stages of brake application, the braking fluid in the master cylinder can be directly passed to the wheel cylinder side without passing through the valve chamber 3. That is, the braking fluid in the master cylinder is admitted to the inlet compartment 4, and the fluid simultaneously flows through the valve chamber 3 and the hollow portions 26 and 27 of the piston 21 to the outlet compartment 7. If the pressure differential between the inlet compartment 4 and the outlet compartment 7 reaches a predetermined level, then the outlet compartment side piston segment 21b is pressed and moved toward the inlet compartment 4 by the difference in the pressure bearing surface area between the piston segments 21a and 21b until the two piston segments are brought into abutting relation. The abutting end of the piston segment 21a has a resilient valve member 29 attached thereto to serve as a valve to close the hollow portions 26 and 27. In the figure, 30a, 30b, 31a and 31b designate springs.

The operation of the embodiments of the braking hydraulic pressure control unit for a motor vehicle in conformity with this invention will now be described. At initial stages of brake application, the quantity of a braking fluid or the pressure thereof is controlled by a compensating circuit including the differential-acting piston 11 (20, 21) shown in FIG. 1 (FIGS. 2, 3) in accordance with the size of shoe clearances. In this condition, the spherical valve 2 in the valve chamber 3 is disposed rearwardly to open the valve port 9 at initial stages of brake application. Thus, as the pressure of the braking fluid in the master cylinder 13 rises gradually, the pressure of the braking fluid in the rear wheel cylinders 14b also rises gradually. If the pressure in the inlet compartment 4 becomes equal to the pressure in the outlet compartment 7, then the differential-acting piston 11 (20, 21) overcomes the biasing force of the spring 12a (30a, 31a) because of the difference in the pressure bearing surface area between the piston segments on the inlet compartment side and the outlet compartment side respectively, with the result that the piston 11 (20, 21) is pushed toward the inlet compartment 4. As the pressure of the braking fluid in the rear wheel cylinder 14b increases gradually, the deceleration of the motor vehicle reaches a predetermined level. Then, the spherical valve 2 is moved by the inertia of the motor vehicle in the vehicle traveling direction (leftwardly in the figures), so that the valve port 9 is closed to cut off communication between the master cylinder 13 and the rear wheel cylinders 14b. Thereafter, a rise in the pressure of the braking fluid in the master cylinder 13 is not directly transmitted to the rear wheel cylinders 14b. However, since the pressure in the inlet compartment 4 becomes higher than the pressure in the outlet compartment 7, the differential-acting piston 11 is pressed toward the outlet compartment 7 to thereby compress the braking fluid on the rear wheel cylinder side which is forced toward the outlet compartment side and squeezed into the downstream side of the spherical valve 2. After the valve port 9 is thus closed by the spherical valve 2, a rise in the pressure of the braking fluid in the master cylinder 13 is indirectly transmitted to the rear wheel cylinders 14b through the differential-acting piston 11 (20, 21), and the magnitude of the pressure is reduced from the pressure of the braking fluid in the master cylinder at a rate which is equal to the ratio of the pressure bearing surface area on the inlet compartment side to the pressure bearing surface area on the outlet compartment side. A comparison of the aforementioned rise in the pressure of the braking fluid in the rear wheel cylinders 14b with a rise in the pressure of the braking fluid in the front wheel cylinders 14a which is directly affected by the rise in the pressure of the braking fluid in the master cylinder 13 shows that the rise in pressure is equal in rate until the spherical valve 2 closes and that the rate of a rise in the pressure of the braking fluid in the rear wheel cylinders 14b is lower than the rate of a rise in the pressure of the braking fluid in the front wheel cylinders 14a after the valve port 9 is closed by the spherical valve 2.

What is claimed is:

1. A braking hydraulic pressure control unit for a motor vehicle comprising:
    an inlet compartment and an outlet compartment communicating with a master cylinder and rear wheel cylinders respectively;
    a valve chamber directly communicating with said inlet compartment and communicating with said outlet compartment through a valve port;
    a spherical valve floatingly contained in said valve chamber and closing said valve port by a force of inertia when the deceleration of the motor vehicle reaches a predetermined level; and
    a differential-acting piston having pressure bearing portions facing said inlet compartment and said outlet compartment respectively;
    wherein the improvement comprises an arrangement of components of said piston which includes:
    a main piston portion having an end surface facing said inlet compartment;
    a first piston segment operatively joined to said main piston portion and movable therewith, said first segment having an end surface facing said outlet compartment;
    a second piston segment relatively movable with respect to said first segment and having an end surface facing said outlet compartment, the area of said end surface of the main piston portion being greater than that of said end surface of the first piston segment whereby an increase in pressure in the inlet compartment during an initial braking period results in said first piston portion being displaced with respect to said second piston segment.

2. A braking hydraulic control unit as set forth in claim 1, wherein said end surface of the first piston segment faces the outlet compartment through an aperture in said second piston segment.

3. A braking hydraulic control unit as set forth in claim 2, wherein said main piston portion and the first piston segment are integrally joined and wherein an internal passage within said piston portion and first segment extends between the end surfaces thereof permitting fluid communication between the inlet and outlet compartments.

4. A braking hydraulic control unit as set forth in claim 3, further comprising:
    means associated with one of said first and second piston segments for interrupting fluid flow through said internal passage in response to relative movement between said segments.

* * * * *